United States Patent [19]

Hummel

[11] Patent Number: 4,716,996
[45] Date of Patent: Jan. 5, 1988

[54] HYDRAULIC ROTATION DAMPER

[75] Inventor: Kurt M. Hummel, Wuppertal, Fed. Rep. of Germany

[73] Assignee: Hermann Hemschedit Maschinenfabrik GmbH & Co., Wuppertal, Fed. Rep. of Germany

[21] Appl. No.: 886,573

[22] Filed: Jul. 18, 1986

[30] Foreign Application Priority Data

Jul. 20, 1985 [DE] Fed. Rep. of Germany ....... 3525965

[51] Int. Cl.⁴ ............................................. F16F 9/14
[52] U.S. Cl. ....................................... 188/306; 16/58; 92/122; 192/58 A
[58] Field of Search ............... 188/306, 308, 309, 310; 192/58 A; 16/57, 58; 92/121, 162 R, 162 P, 122

[56] References Cited

U.S. PATENT DOCUMENTS

| 1,940,871 | 12/1933 | Logan | 188/308 X |
| 2,419,651 | 4/1947 | Magrum | 188/309 X |
| 3,237,728 | 3/1966 | Rumsey | 188/309 |
| 3,385,408 | 5/1968 | Manning | 188/290 |

FOREIGN PATENT DOCUMENTS

| 2515985 | 10/1976 | Fed. Rep. of Germany . |
| 2515986 | 10/1976 | Fed. Rep. of Germany . |
| 2602233 | 2/1977 | Fed. Rep. of Germany . |
| 90712 | 7/1981 | Japan | 188/306 |
| 167194 | 7/1921 | United Kingdom | 188/306 |
| 792932 | 4/1958 | United Kingdom | 188/306 |

*Primary Examiner*—George E. A. Halvosa
*Attorney, Agent, or Firm*—Berman, Aisenberg & Platt

[57] ABSTRACT

An hydraulic rotation damper comprises a bearing housing with inner stator vanes and a rotor with rotor vanes, the rotor being arranged on a carrier arm journal which is mounted in bearings in the bearing housing with the stator vanes and the rotor vanes forming working chambers. At least one damping valve is provided for transferring working medium from pressure-loaded working chambers into unloaded working chambers. Further, the working chambers are closed at both ends by end walls containing valve-controlled passages leading into annular gaps which are separated by the end walls from the working chambers. This permits pressure medium at a pressure corresponding to the working pressure in the respective working chambers to be fed to the annular gaps where the pressure medium applies pressure to the outer surfaces of the end walls of the working chambers to prevent axial displacement of those walls.

8 Claims, 2 Drawing Figures

HYDRAULIC ROTATION DAMPER

This invention relates to an hydraulic rotation damper comprising a bearing housing with inner stator vanes and a rotor with rotor vanes mounted therein, the rotor being mounted on and engaging with a carrier arm journal and the stator vanes and the rotor vanes being arranged to form working chambers, there being at least one damping valve for transferring working medium from pressure-loaded working chambers into unloaded working chambers, as well as side or end parts which close the bearing housing at both ends and each of which accommodates a bearing for the carrier arm journal.

Such hydraulic rotation dampers are used, for example, in heavy track-laying vehicles. In known hydraulic rotation dampers—see, for example DE-OS 26 02 233, DE-OS 25 15 985 and DE-PS 25 15 986—the hydraulic pressure in the working chambers is supported by the side or end walls of the side or end parts which laterally bound the working chambers. By reason of the relatively large end faces of these rotation dampers, very high pressure forces act upon the side or end walls. By reason of these forces, the side or end walls are displaced axially to an extent depending on their thickness with the result that circumferential gaps occur through which working medium can escape. This leads to a considerable reduction in the performance of the damper.

The problem with which the present invention is concerned is to improve a rotation damper in such a way that, while keeping the damper simple and cost-effective, the occurrence of circumferential gaps at the pressure-loaded side or end walls of the working chambers due to axial displacement of those walls is prevented.

In accordance with the invention, this is achieved by the provision of counter-acting pressure means in the side or end parts which exert a counter-acting pressure, corresponding to the working pressure in the respective working chambers, on the side or end walls of the working chambers.

In one particular construction in accordance with the invention, the counter-acting pressure means comprise annular gaps which are separated from the working chambers by the side walls and which contain working medium at working pressure. As the working pressure is now therefore applied to the outer surfaces of the side or end walls of the working chambers, outward bending of the walls is prevented. In other words, the oppositely-directed pressure forces on both sides of the side or end walls cancel out each other, with the result that deformation or displacement of these walls is prevented.

Preferably, the damping valve is arranged outside the working chambers and is used for tension damping and compression damping. By arranging the damping valve outside the working chambers, temperature problems are removed in that the conducting-away of heat is more favourable. More specifically, the heat is distributed to the entire volume of hydraulic oil by the circulation. Moreover, in the case of an appropriate through-flow the use of only one single damping valve becomes possible, since no change occurs in the direction of through-flow.

An example of an hydraulic rotation damper in accordance with the invention is shown in the accompanying drawings, wherein.

Figure 1:
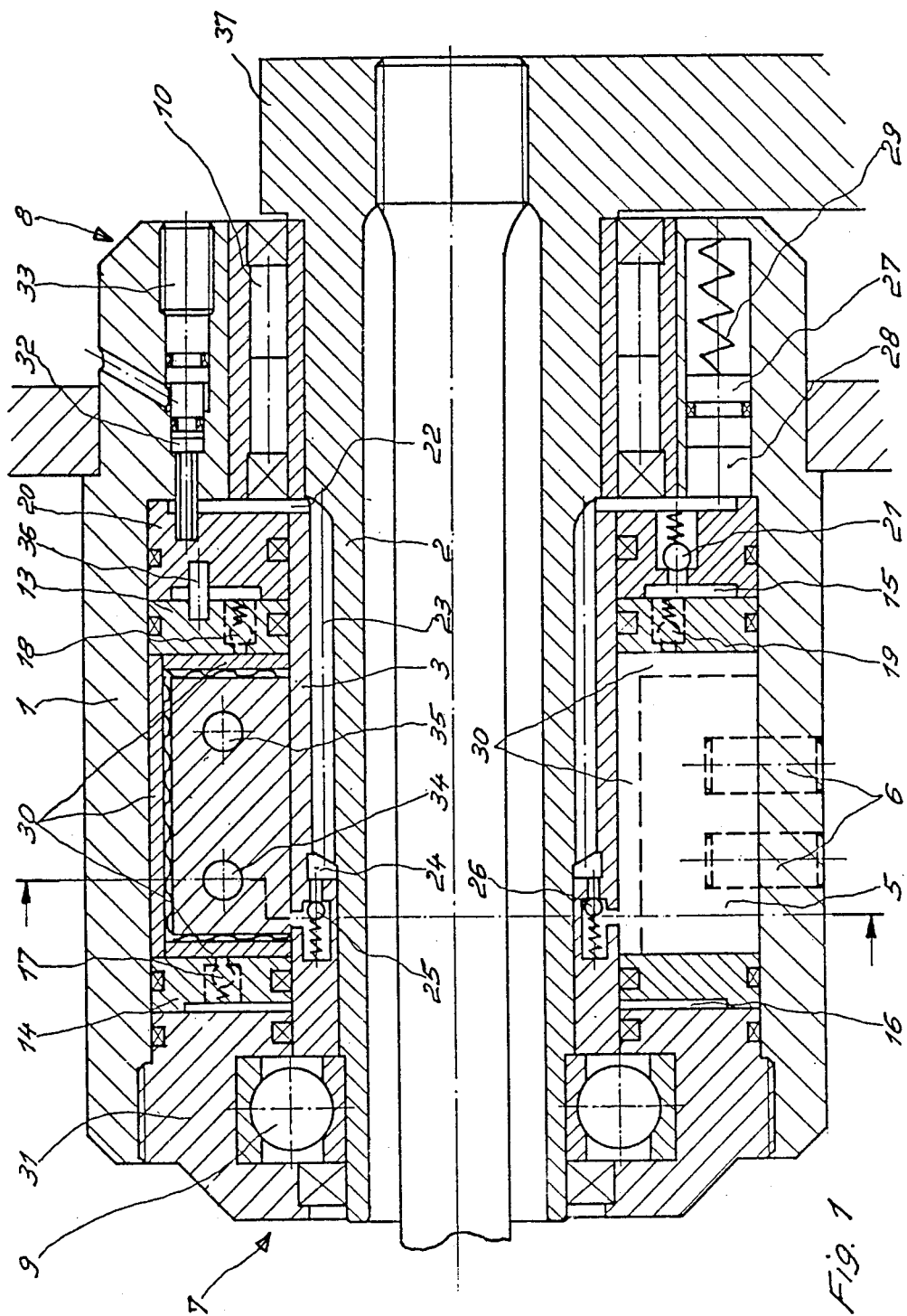
FIG. 1 is a longitudinal section through the damper.

The rotation damper shown in the drawings comprises a bearing housing 1 and a carrier arm journal 2 mounted in bearings therein. This journal is connected to a road wheel (not shown) which is to be sprung. A rotor 3 with radial outwardly-extending rotor vanes 4 is shaped to seat on the carrier arm journal 2. In the particular example shown there are three rotor vanes 4 which are angularly-spaced from one another by 120 degrees. Stator vanes 5 are secured by means of bolts 6 to the inner side of the housing 1. In conformity with the number of rotor vanes 4, three stator vanes 5 are provided. These are likewise angularly-spaced in relation to one another by 120 degrees in such a way that there are intervals of equal size between the rotor vanes and the stator vanes. The housing 1 is closed on both sides or at both ends by side or end parts 7, 8. Bearings 9, 10 for the carrier arm journal 2 are arranged in the side parts 7, 8 respectively. Between the bearing housing 1 and the stator vanes 5 and between the rotor 3 and the rotor vanes 4 there are formed working chambers 11, 12 in alternating sequence (see FIG. 2). In the axial direction the working chambers 11, 12 are closed off by side or end walls 13, 14. The side or end wall 13 nearer to the damper support 37 can be made in one piece with the rotor 3 or can be mounted rotatably on the rotor, as illustrated, while the side or end wall 14 further from the damper support 37 forms a separate part. Pressure-responsive valves 17, 18 are arranged in the side or end walls 13, 14 respectively. These valves 17, 18 connect the respective working chambers with annular gaps 15, 16 in the outer surfaces of the side or end walls 13, 14. The valves 18 are associated with the working chambers 11 while the valves 19 are associated with the working chambers 12 but transmit pressurised fluid in the opposite direction.

The annular gap 15 is closed by an inner closure part 20 which is inserted in a radially-sealing manner between the inner wall of the housing 1 and the rotor 3 and which is connected through a bolt 36 with the side wall 13 so as to be secured against rotation. In the closure part 20 there is, or are, one or more damping valves 21 forming a connection between the annular gap 15 and an inner annular space 22 which is formed between the inner closure part 20 and the side or end part 8. This inner annular space 22 is connected with a longitudinally-extending passage 23 which extends along the carrier journal 2 between the inter-engaging teeth (not shown) on the carrier journal 2 and the rotor 3, the passage 23 being arranged to terminate in an outer annular space 24. Both the axial passage 23 and the annular space 24 are formed between the carrier arm journal 2 and the rotor 3. The annular space 24 is connected through valves 25 to the working chambers 11 and through valves 26 to the working chambers 12. The valves 25, 26 have like transmission directions and are seated in the rotor 3.

A piston 27 which is axially displaceable in a cylinder bore 28 in the inner side part 8 against the force of a spring 29 serves to take up the increased volume of the working medium which occurs on heating of the latter. At the same time, the spring-loaded piston 27 exerts, in proportion to the heat generation, a cavitation-inhibiting pressure upon the medium in the annular space 22 directly behind the working valves 21.

The rotor vanes 4 and the stator vanes 5 are sealed circumferentially, see FIG. 1, with resiliently-formed sealing strips 30 so that sealing of the working chambers 11, 12 is achieved, the sealing strips 30 also serving to compensate for geometrical deviations of form in manufacture. An outer closure portion 31 of the side or end part 7 is screwed into the housing and supports the carrier arm bearings 9, 10 in the housing in the axial direction so that it takes up axial forces on the damper.

An oil filler screw 33 is screwed in the side or end part 8 within a longitudinal bore 32 so that filling of the secondary chambers with hydraulic fluid can take place after fitting of the damper. Moreover, oil level inspection and also fixing of the closure part 20 can take place by way of the oil filler screw 33.

In the rotor vanes 4 there are arranged valves 34 and 35 which serve as over-pressure valves in the direction opposite to the direction of rotation of the vanes. These valves 34 and 35 interconnect the working chambers 11, 12. As will be seen from FIGS. 1 and 2, all parts are circumferentially sealed so that the escape of working fluid to the exterior of the casing 1 is prevented.

Figure 2:
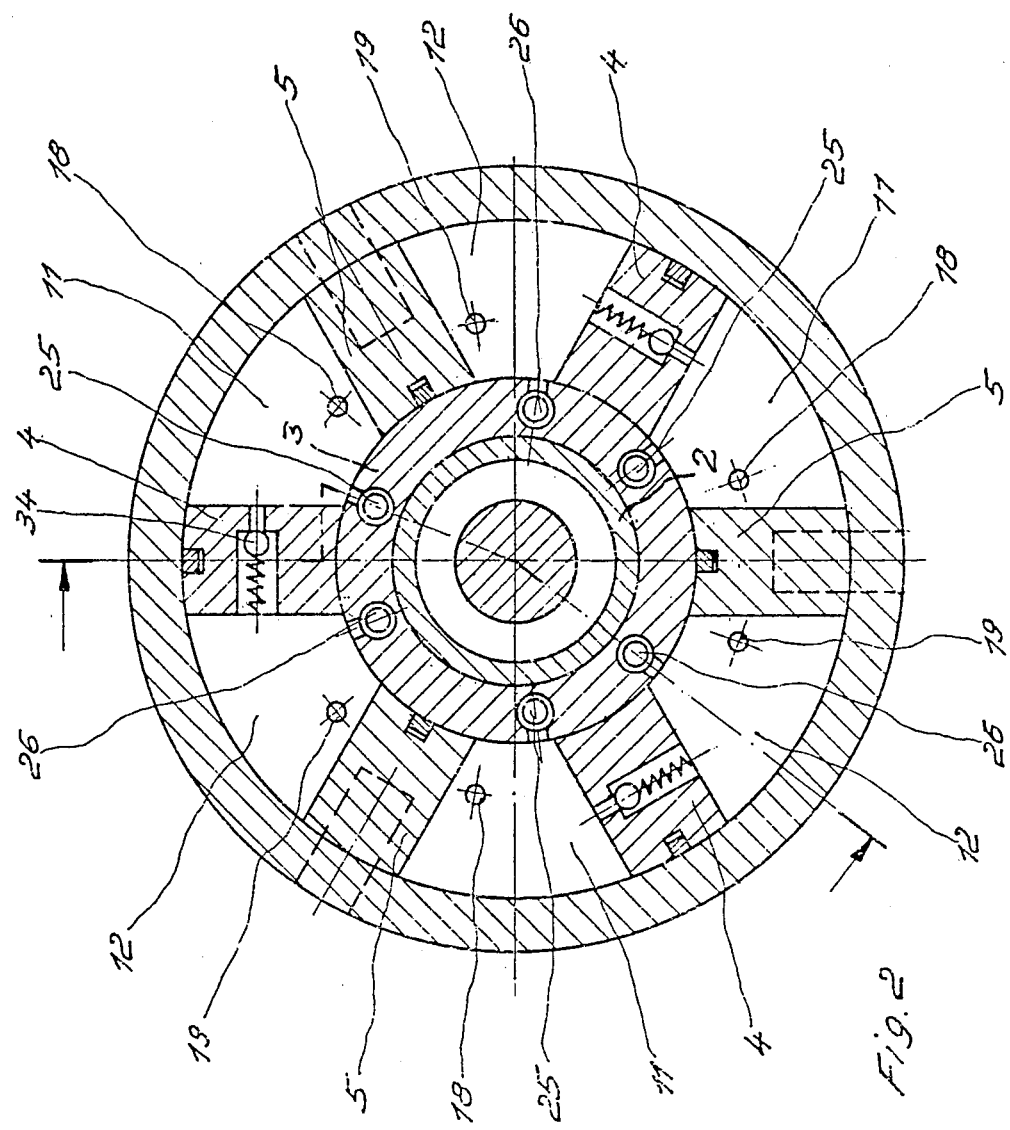
FIG. 2 is a section taken on the line II—II in FIG. 1.

The manner of operation of the hydraulic rotation damper described above is as follows:

On rotation of the rotor vanes 4—for example, in a clockwise direction as seen in FIG. 2—hydraulic fluid forming the working medium flows out of the working chambers 11 through the pressure-responsive valves 17, 18 in the side walls 13, 14 into the annular gaps 15, 16. From the annular gap 15 the hydraulic fluid passes the damping valve 21 seated in the inner closure part 20 and flows into the annular space 22. From the annular space 22, the hydraulic fluid flows through the passage 23 into the annular space 24 and thence through the valves 26 into the pressure-less working chambers 12 which lie behind the rotor vanes 4 seen in the direction of rotation. During this working condition of the rotation damper the valves 19 and 25 are held in the closed state by working pressure.

On reversal of the movement of the rotor vanes 4, that is to say, on a subsequent movement in the counter-clockwise direction, and valves 19 and 25 are loaded in the opening direction and the valves 18, 26 are held closed by the working pressure so that the working medium can now flow from the chambers 12 into the chambers 11.

It will thus be seen that the hydraulic rotation damper described above is of simple design while ensuring that outward bending of the side or end walls of the working chambers is prevented by conducting working pressure to the other sides of the side or end walls of the working chambers. This means that the axial forces within the chambers—which can lie in the region of 35 tons with a working pressure of 300 bars—is compensated by the application of working pressure to the outer faces of the end or side walls. It is also advantageous for the damping valve to be used for tension damping and compression damping and to be arranged outside the working chambers. The compensation of the hydraulic pressure through the closure parts 20 and 31 facing the bearings, which can have no influence upon the sealing of the damper in the case of deformation, is also beneficial.

I claim:

1. An hydraulic rotation damper comprising: a bearing housing with inwardly-extending angularly-spaced stator vanes, a carrier arm journal mounted in spaced-apart bearings in the bearing housing, a rotor with outwardly-extending angularly-spaced rotor vanes arranged to be interspersed with respect to the stator vanes so that each rotor vane is flanked by stator vanes, the rotor being shaped to seat on the carrier arm journal, a plurality of working chambers defined by the stator vanes and the rotor vanes and by spaced-apart end walls in the bearing housing, a pair of annular gaps arranged one near each end of the working chambers but separated therefrom by the end walls of the working chambers, at least one passage extending between the working chambers and each annular gap for feeding working medium at a pressure corresponding to the pressure present in the working chambers to those annular gaps, one-way valves arranged in the end walls of the working chambers and adapted to open in one direction only for the supply of working medium through the said passages to the annular gaps, and a passage containing a damping valve connecting at least one of the annular gaps with an annular space in communication with the working chambers for the transfer of working medium from pressure-loaded working chambers into unloaded working chambers during operation of the damper.

2. An hydraulic damper according to claim 1, wherein the damping valve is arranged in a closure part separating the said one of the annular gaps from the said annular space and serves both for tension damping and for compression damping.

3. An hydraulic rotation damper according to claim 2, wherein one of the end walls of the working chambers is connected through a bolt with the said closure part and is mounted on the rotor.

4. An hydraulic rotation damper according to claim 1, wherein one of the annular gaps is closed to the exterior by a closure part accommodating one of the bearings for the carrier arm journal.

5. An hydraulic rotation damper according to claim 1, wherein a spring-loaded piston is arranged in a cylinder bore in one of two end parts on the pressure-less rear of a rotor vane in such a way that it is chargeable by the fluid medium in the annular space.

6. An hydraulic rotation damper according to claim 5, wherein a filler screw is screwed in a threaded bore in one of the end parts which terminates in the annular space.

7. An hydraulic rotation damper according to claim 1, wherein valves acting in opposite directions are arranged as over-pressure valves in the rotor vanes.

8. An hydraulic rotation damper according to claim 1, wherein the rotor vanes and the stator vanes are sealed off circumferentially by resilient sealing strips.

* * * * *